United States Patent [19]

Alfano

[11] Patent Number: 4,487,026

[45] Date of Patent: * Dec. 11, 1984

[54] REFRIGERATION SYSTEM ENERGY MANAGEMENT CONTROL DEVICE AND METHOD

[76] Inventor: Vincent J. Alfano, 15735 James, Southgate, Mich. 48195

[ * ] Notice: The portion of the term of this patent subsequent to Apr. 6, 1999 has been disclaimed.

[21] Appl. No.: 357,360

[22] Filed: Mar. 12, 1982

[51] Int. Cl.³ .............................................. F25B 15/00
[52] U.S. Cl. ...................................... 62/101; 62/141; 62/148; 62/476
[58] Field of Search ................. 62/101, 148, 141, 476, 62/178, 179, 180

[56] References Cited

U.S. PATENT DOCUMENTS 4,322,951  4/1982  Alfano .................................. 62/101

Primary Examiner—Lloyd L. King
Attorney, Agent, or Firm—Remy J. VanOphem

[57] ABSTRACT

A control device for an absorption system interrupts a pneumatic signal controlling the demand for chilled water by utilizing a single port direct acting controller to which is fed a chilled water return temperature signal. The single port direct acting controller provides a continuous signal to control the heating source utilized in providing the chilled water as a real time function of the temperature of the chilled water returning from an associated cooled building, as well as the internal controls of the absorption system. Thus, the control device provides an optimal decision value, factoring all dynamic operating variations which affect chilled water return temperature, for the control of the heating source utilized in providing chilled water, thereby reducing the fuel consumption of the absorption refrigeration system. Alternatively, a dual port direct acting controller is added, to which are fed an outdoor air humidity signal and an outdoor air temperature signal. The dual port direct acting controller provides a signal to control the heating source utilized in providing the chilled water as a function of the outside air temperature and outside air humidity to enhance control system flexibility and operator options.

6 Claims, 4 Drawing Figures

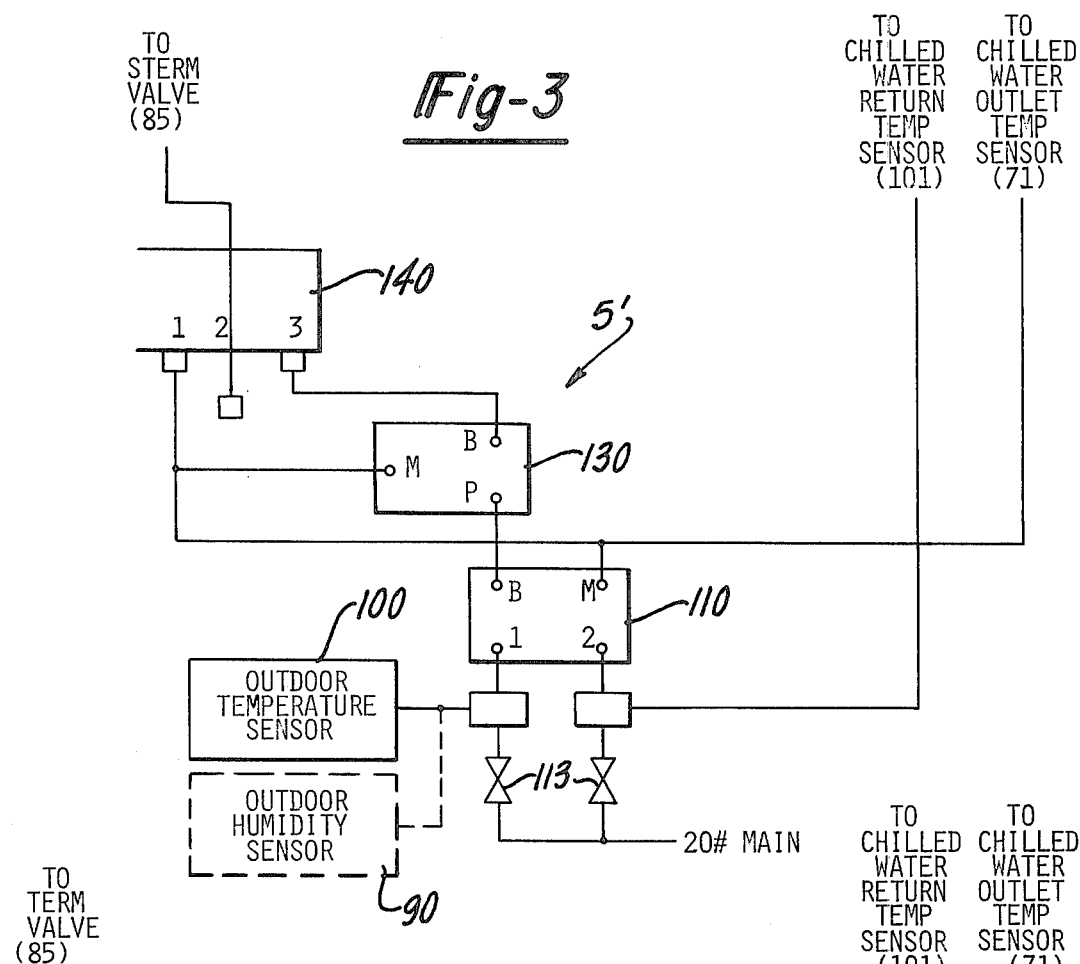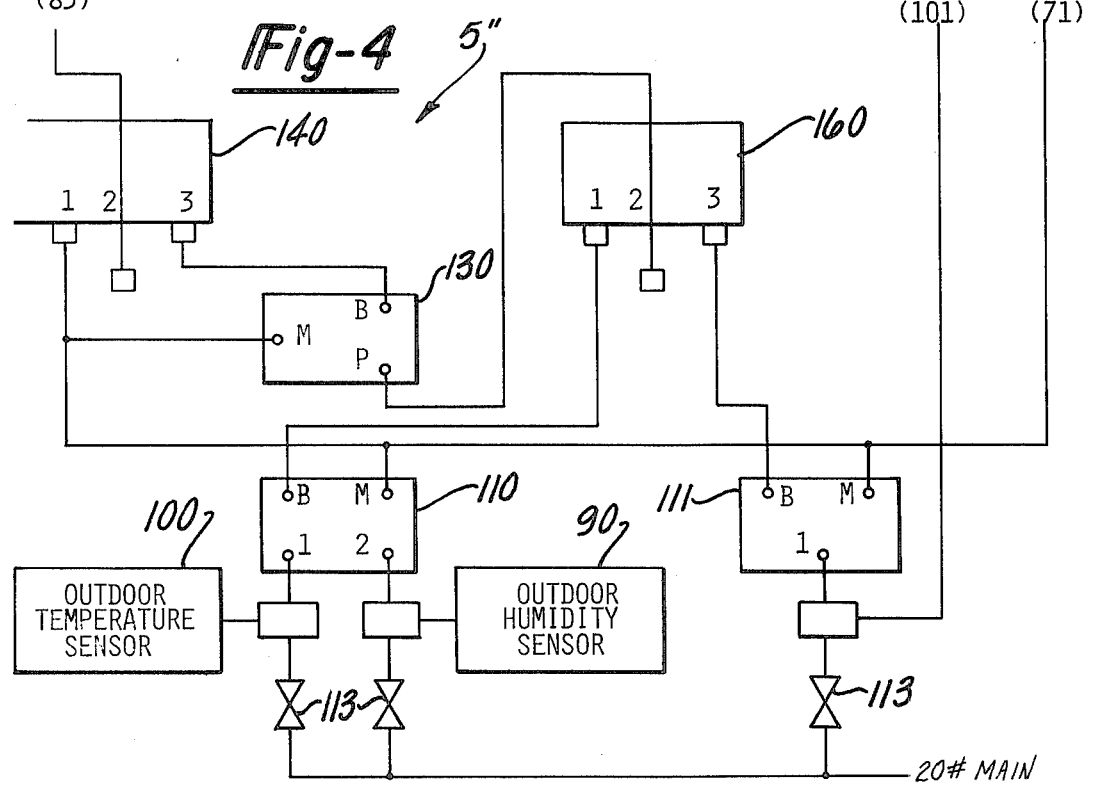

REFRIGERATION SYSTEM ENERGY MANAGEMENT CONTROL DEVICE AND METHOD

CROSS-REFERENCE TO RELATED APPLICATIONS

The present invention is related to that disclosed in pending U.S. patent application Ser. No. 147,603, filed May 7, 1980, now U.S. Pat. No. 4,322,951, issued Apr. 6, 1982.

BACKGROUND OF THE INVENTION

1. Field of the Invention

The present invention relates generally to a method and apparatus for controlling a refrigeration system and, more particularly, to a method and apparatus for economizing the operation of an absorption, centrifugal or other type refrigeration system.

2. Description of the Prior Art

In most large air conditioned buldings, the energy source for the air conditioning system is the largest single consumer of energy. Thus, projected utility costs play a large role in determining the specifications of a new building's heating and cooling plant. Most large commercial structures employ absorption or centrifugal type refrigeration systems. In the case of absorption-type refrigeration systems, fuel to generate steam heat is the primary energy consumer. In the case of centrifugal-type refrigeration systems, the electrically-driven compressor motor is the primary energy consumer. At present, most chillers are programmed to operate and control an air-conditioning system by chilling water to a constant predetermined temperature to meet the air conditioning needs on the hottest day of the year. This arrangement results in substantial system over capacity much of the time with attendant inefficiencies and increased utility or energy costs. Chiller controls that automatically adjust the chilled water temperature to meet the requirements of a cooling loop on a moment-to-moment basis have been proposed and can substantially reduce total system power consumption.

Centrifugal cold-type refrigeration systems for chilling a fluid medium which may then be used to provide refrigeration to any desired location are well known. In a typical centrifugal refrigeration system, a high-pressure refrigerant vapor is discharged from a compressor in a super-heated state and enters a condenser. In the condenser, the refrigerant vapor is condensed, essentially at constant pressure, by giving up its latent heat to the cooling water flowing through a heat exchanger or to the atmosphere. The saturated liquid refrigerant is collected in a receiver tank. Thereafter, the saturated liquid refrigerant enters an expansion valve or throttling valve at high pressure. The expansion valve effects a substantial pressure reduction in the refrigerant. Simultaneously, with the reduction in pressure, an associated reduction in temperature takes place, the new temperature corresponding to the boiling temperature at this lower pressure. The actual mechanism accounting for this lowering of the liquid refrigerant temperature consists of the flashing into vapor of a portion of the liquid and, as there exists no external source of heat, the energy for this evaporation is supplied by the liquid refrigerant itself, thus causing its temperature to drop. The low-temperature liquid refrigerant, with a small fraction of its vapor, is then admitted to a heat exchanger called an evaporator. Within the evaporator, the liquid refrigerant is evaporated by heat transferred to it from the comparatively warmer space to be refrigerated. The flow rate of the refrigerant is so adjusted by the thermostatic expansion valve that at the exit of the evaporator all the liquid refrigerant is in the saturated vapor state. The vapor leaving the evaporator enters the suction side of the compressor and is compressed to a higher pressure. The work of compression raises both the pressure and temperature of the refrigerant vapor so that it is discharged in the superheated vapor state and ready to repeat the entire cycle over again.

Efficient operation of the heat exchanger is extremely important to the economic cycling of the refrigerant within the centrifugal refrigeration system. Typically, centrifugal refrigeration systems are controlled by providing a temperature sensor which senses the temperature of the fluid medium generally as it leaves the evaporator. The signal from the sensor is then used to control the capacity of the refrigeration system according to its predetermined constant fluid medium temperature output. In a centrifugal-type refrigeration system, this is accomplished by controlling the compressor's inlet vane geometry by techniques well known in the art.

Absorption cold-type refrigeration systems for chilling a fluid medium which may then be used to provide refrigeration to any desired location are also well known. In a typical absorption refrigeration system, a liquid chilled in an evaporator is circulated to a refrigeration load, such as one or more remotely located air conditioning units or cooling system for an industrial process. Typically, the system includes a concentrator section, an evaporator section, a condenser section, an absorber section and a heat exchanger. In the concentrator section, heat energy from steam or hot water is used to boil a dilute solution of lithium bromide and water. This boiling results in release of water vapor, and in concentration of the remaining lithium bromide solution. The water, or refrigerant vapor released in the concentrator, is drawn into the condenser section. Cooling tower water flowing through the condenser tubes cools and condenses the refrigerant. The refrigerant flows through an orifice into the evaporator section. The pressure in the evaporator section is low, corresponding to a refrigerant saturation temperature of approximately 40° F. The refrigerant is sprayed over a tube bundle containing building system water. The system water gives up heat to the refrigerant, causing it to vaporize. Water is frequently used as the refrigerant, the chilled fluid, and the cooling media, and the source of heat in a generator may be steam or hot water circulated in a heating coil. Typically, when the refrigerant is water, the absorbent solution is a hygroscopic brine, such as an aqueous solution of lithium bromide or lithium chloride. As is well known, however, a large number of fluids with widely varying characteristics may be used in absorption refrigeration systems.

The refrigerant vapor is drawn to the absorber section by the low pressure resulting from absorption of the refrigerant into the absorbent. In order to expose a large amount of lithium bromide solution surface to the water vapor, the solution is sprayed over the absorber tube bundle. The absorber cooling coil is connected in a cooling circuit which usually also includes the condenser coil conveniently situated in series with the cooling coil. The cooling water is conducted from the condenser coil to a remotely located cooling tower where the heat abstracted in the absorber and in the condenser is rejected to ambient air; that is, the air out-of-doors. Cooling tower water is used in the tube bundle within the absorber section to remove the heat of absorption that is released when the refrigerant vapor returns to the liquid state. The degree of affinity of the absorbent for refrigerant vapor is a function of the absorbent solution concentration and of temperature. The more concentrated the solution and the cooler the solution, the greater the affinity for refrigerant vapor. Consequentially, the pressure, and thereby the saturation temperature, in the evaporator is controlled by the concentration of lithium bromide solution in the absorber. The concentration of this solution is determined by the amount of heat applied in the concentrator section of the machine. As the absorbent absorbs refrigerant vapor, the solution becomes increasingly dilute. It is necessary to continuously circulate this dilute solution back to the concentrator in order to keep the cycle continuous.

A heat exchanger exchanges heat between the relatively cool, dilute solution being transferred from the absorber to the concentrator section with a hot, concentrated solution being returned from the concentrator to the absorber. Transferring heat from the concentrated solution to the dilute solution reduces the amount of heat that must be added to bring the dilute solution to a boil. Simultaneously, reducing the temperature of the concentrated solution reduces the amount of heat that must be removed from the absorber section in order to obtain the desired absorber efficiency. Efficient operation of the heat exchanger is extremely important to the economic operation of the lithium bromide water cycle. Typically, absorption refrigeration systems are controlled by providing a temperature sensor which senses the temperature of the fluid medium as it leaves the evaporator, as in the case of the centrifugal refrigeration system. The signal from the sensor is then used to control the capacity of the refrigeration system according to its predetermined constant fluid medium temperature output. In an absorption-type refrigeration system, this is accomplished by controlling the concentration of the refrigerant-absorbent solution supplied to the absorber.

Other control systems, such as those disclosed in U.S. Pat. Nos. 3,099,139 and 3,250,084 employ two separate temperature sensors, one disposed to sense the temperature of the fluid medium entering the refrigeration system, and another to sense the temperature of the fluid medium after it has been cooled by the refrigeration system. However, these control systems, as well as the other prior art control systems known to the Applicant, are only adapted to vary the refrigeration capacity of the system in response to varying load conditions and not in response to changes in the internal conditions in the refrigeration system itself. The control system described in U.S. Pat. No. 4,090,372 attempts to solve this problem by providing means disposed for sensing variations in the temperature of the fluid medium both as it enters and leaves the evaporator and for sensing variations in the temperature in the absorber. This sensing means provides first, second and third tracking signal outputs indicative of the sensed temperature variations, the first tracking signal output being indicative of the variations in temperature of the fluid medium at the evaporator inlet, the second tracking signal output being indicative of the variations in temperature of the fluid medium at the evaporator outlet; and the third tracking signal output signal being indicative of the variations in temperature within the absorber. Comparator means are utilized for comparing the signals and providing a first control signal output indicative of the selected tracking signal. A second control signal output is generated dependent on the relative values of the second tracking signal and the first control signal. The first and second tracking signal outputs are also operatively connected to a difference means which provides a third control signal output indicative of the difference between the first and second tracking signals. The control system also includes a second comparator means operatively connected to the second and third control signal outputs for comparing the second and third control signals and selecting one of them based upon its relative value as compared with the other and for providing a fourth signal output indicative of the selected control value. This fourth signal control is then used to control the components of the refrigeration system which controls the concentration of the refrigerant absorbent solution supplied to the absorber. This complicated control system operates to reduce the fuel input to the refrigeration system whenever the fuel is being inefficiently used due to changes in internal operating temperatures or other criteria of the refrigeration system. Further, this complicated control system is designed to vary the output chilled water temperature in response to changes in load, thereby further reducing fuel consumption of the refrigeration system.

All of the above-discussed prior art control systems direct themselves to developing control devices of varying degrees of sophistication for regulating the operation of the absorption refrigeration system controlling parameters within the system itself. Even with these sophisticated internal controls, the system will often times generate excess chilled water for circulation throughout the building which has been lowered to a temperature below the comfort point thereby requiring auxiliary heating systems to automatically provide heat in order to compensate for the excessive cooling. In effect, the absorption type refrigeration system of the type used in large building complexes relies upon an auxiliary heating system in order to provide comfortable conditioned air for an installation such as a large hospital.

U.S. Pat. No. 4,270,361 to LaBarge discloses a controller for a centrifugal type water chiller which overcomes some of the shortcomings of the prior art in the area of optimized energy management. In LaBarge, an automatic chiller control provides a temperature sensitive load limit compressor control on a cooling water system, such as is used in buildings for air conditioning. The controller operates across at least one motor driven compressor and operates to adjust the vane inlet of a typical centrifugal compressor. Control is provided in discrete steps responsive to changes in cooling water temperature as the water typically returns from a building. The control, when operated in the automatic position, starts the chiller at minimum possible power consumption. Increasing load or unload of the chiller is provided in incremental steps (for example, 5% of full load) at preselected time intervals (for example, ten minutes) which are typically adjustable to any other desired time span. The control seeks the required motor power output to improve operating efficiency. Provision is made where the controller is operating the chiller at less than an efficient level (for example, with vanes closed) to periodically shut the chiller down for an adjustable time as required. Options of overriding manual adjustment as well as manual adjustment only are also disclosed.

Although devices, such as that disclosed in LaBarge, represent improvements over the theretofore prior art devices to date, no prior art devices have attempted to continuously control the refrigeration system on a real time basis as a function of the temperature of chilled water returning from the load or building. Instead, LaBarge only controls operation of the water chiller during select portions of the duty cycle, such as start-up, and only operates intermittently, after pauses of predetermined duration.

Additionally, none of the prior art devices to date have attempted to introduce a control signal directly to the refrigeration system which controls the amount of refrigerant or chilled water produced as a function of outdoor air temperature and outdoor humidity. In other words, the prior art devices have failed to recognize that the refrigeration system chilled water output is a function not only of the demands of the system's internal characteristics for generating a set quantity of chilled water but, also a function of the outdoor humidity and outdoor temperature.

Although the present invention is described as embodied in an absorption-type refrigeration system, it is to be understood that it can be applied with equal success in centrifugal or other types of refrigeration as will be apparent to those of ordinary skill in the art in view of the present specification. Additionally, although described as being applied to a single load, it is contemplated that it can be employed with multiple or ganged loads with only minor modification. Finally, although described and primarily intended for large institutional-type structures, such as hospitals and office complexes where precise, high performance, versatile and cost-efficient heating/cooling plants are imperative, in its broadest sense, the device described herein can also be applied to many other types of loads.

SUMMARY OF THE INVENTION

The control system contemplated in this invention simply interrupts the signal controlling the demand of chilled fluid medium by utilizing a single port direct acting controller to which is fed a fluid medium return temperature signal. The chilled fluid medium demand then becomes a function of fluid medium return temperature, as well as the internal controls of the refrigeration system, thereby providing an optimal decision value factoring in all dynamic operating variations, both internal and external, of the load, which affect temperature changes in the returning fluid medium. By properly initially calibrating the single port direct acting controller, as well as the temperature sensing device, the control system of the present invention may be adapted for use with any type refrigeration system. This arrangement not only provides a more effective, lower cost method of control in applications where loads are applied in tandem, but overcomes most shortcomings of the prior art.

The control system of the present invention operates to reduce fuel input to the refrigeration system due to all internal or external factors affecting the load and the fluid medium return temperature. Further, the control system is designed to be used in conjunction with or without some of the prior art internal control systems for reducing fuel consumption by the refrigeration system.

In its preferred, illustrative embodiment, the control system of the present invention is pneumatic and the fluid medium is chilled water. The environment is an absorption refrigeration system wherein is used a single port controller to which is fed the fluid medium return temperature signal. The chilled fluid medium demand then becomes a function of the fluid medium return temperature signal as well as the internal controls of the refrigeration system. In an alternative embodiment of the invention, the control system uses a dual port direct acting controller to which is fed an outdoor humidity or an outdoor temperature signal, and a fluid medium return temperature signal. The chilled fluid medium demand then becomes a function of outside temperature or humidity, and the fluid medium return temperature, as well as the internal controls of the refrigeration system. By properly initially calibrating the dual port direct acting controller, as well as the temperature and/or humidity sensor devices, the control system of the present invention may be adapted for use with any type refrigeration system.

In a second alternative embodiment of the invention, the inventive control system interrupts the signal controlling the demand of chilled fluid medium by using, in combination, a single and dual port direct acting controller to which is fed a fluid medium return temperature signal and an outside air temperature and humidity signal. The chilled fluid medium demand then becomes a function of all three signals, as well as the internal controls of the refrigeration system, thereby providing an optimal decision valve factoring in all dynamic operating variations, both internal and external, of the load which effects temperature changes in the returning fluid medium, including the respective climatic range of conditions. By properly initially calibrating the direct acting controllers, as well as the temperature and humidity sensing devices, this embodiment of the present invention provides maximized performance and flexibility.

Accordingly, the primary object of the present invention is to avoid the demand for excessive cooling of the chilled fluid medium (water) thereby avoiding the requirement of reheating of the chilled fluid medium in order to provide an appropriate comfort level within the building atmosphere controlled by the refrigeration system.

Another object of the invention is to provide an inexpensive control device which throttles the refrigeration system's demand for chilled fluid medium as a function of the fluid medium return temperature thereby eliminating excessive cooling and reheating of the building's air supply.

Another object of the invention is to provide an inexpensive control device which throttles the refrigeration system's demand for chilled fluid medium as a function of outside temperature and humidity thereby eliminating excessive cooling and reheating of the building's air supply and enhancing system flexibility.

It is a further object of this invention to provide a control device which does not impair the internally provided safety shutdown features essential to the operation of an absorption-type refrigeration system.

It is still a further object of the invention to provide a control device which incorporates selector switch means to enable returning the machine to normal operation and bypass the outside air temperature signal, outside air humidity signal and/or chilled water return temperature sensor controller.

These, as well as further objects and advantages of the control system according to the present invention will become more fully apparent from the following detailed description and annexed drawings of the several embodiments thereof.

BRIEF DESCRIPTION OF THE DRAWINGS

A better understanding of the present invention will be achieved upon reference to the accompanying specification and by reference to the following drawings wherein like numerals refer to like parts throughout, and in which:

FIG. 3 is a partially diagrammatic and partially schematic view illustrating an alternative control system according to the present invention; and FIG. 4 is a partially diagrammatic and partially schematic view illustrating a second alternative control system according to the present invention.

DETAILED DESCRIPTION OF THE PREFERRED EMBODIMENT

Figure 1:
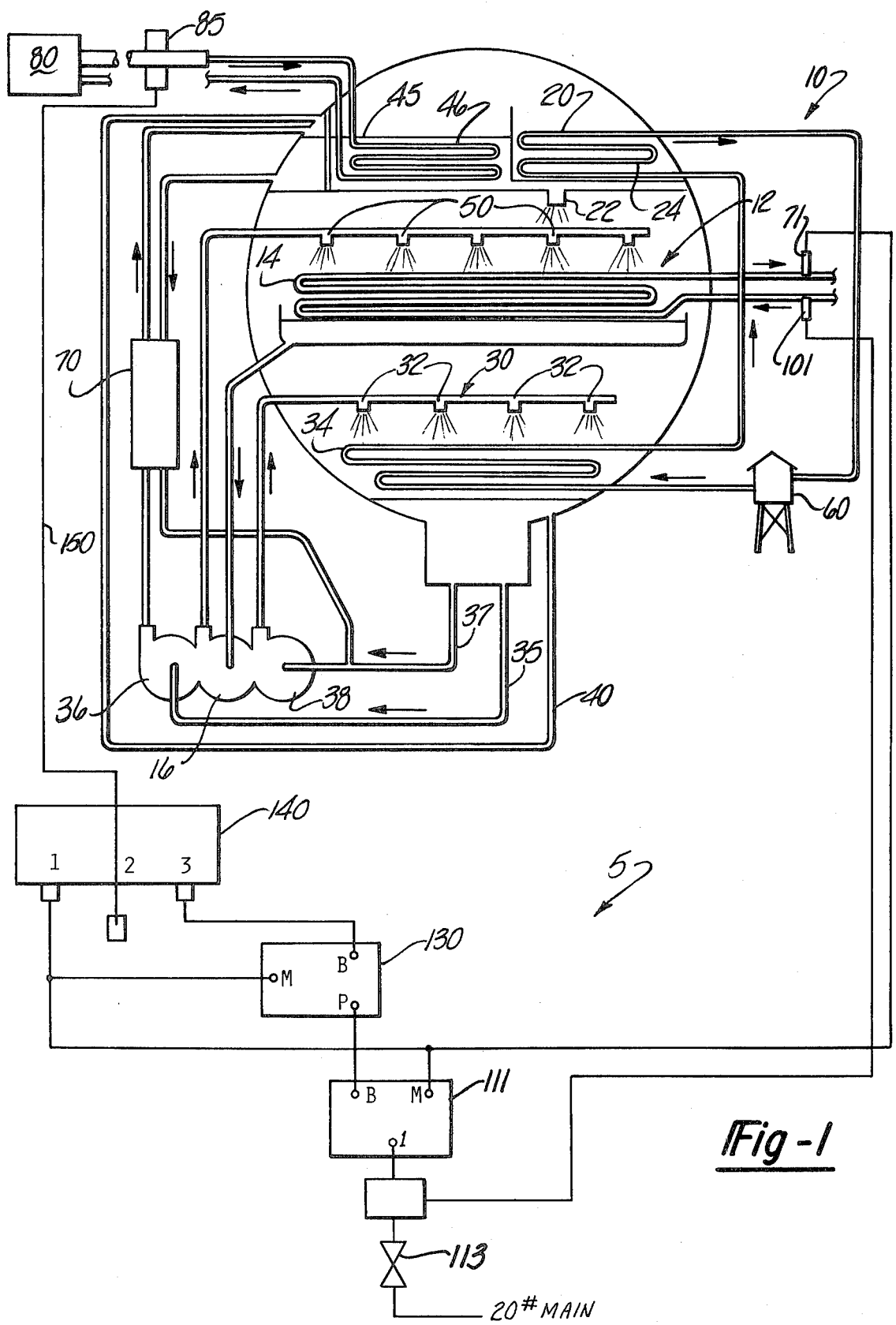
FIG. 1 is a partially diagrammatic and partially schematic view illustrating the preferred control system according to the present invention, together with an absorption-type refrigeration system whose operation is to be controlled.

Referring now to FIG. 1, the preferred control system 5 of the present invention is illustrated together with a conventional absorption-type refrigeration system 10 whose operation is to be controlled. The conventional refrigeration system 10 is of the absorption type and includes an evaporator 12, condenser 20, absorber 30, and a concentrator 45.

In order to obtain a more complete understanding of the operation of the present invention, the operation of a conventional absorption-type refrigeration system will first be described. It is to be understood, however, that the refrigeration system 10 is illustrative in nature and is not to be considered limiting.

In operation, the fluid medium to be chilled is circulated through a coil 14 in the evaporator 12. Since the fluid medium is most commonly water, it will be assumed for purposes of this description that water (hereinafter referred to as the system water) is circulating through the coil 14. Those skilled in the art, however, will recognize that other liquids may also be employed.

A refrigerant enters the evaporator 12 from the condenser 20 through an orifice 22. The evaporator pressure is maintained at a low enough level to vaporize a portion of the refrigerant as it passes through the orifice 22. As the refrigerant vaporizes, it absorbs its latent heat of vaporization thereby cooling and condensing the remainder of the refrigerant which collects at the bottom of the evaporator 12. The liquid refrigerant is then fed through an evaporator pump 16 to spray trees 50 which spray the refrigerant on the coil 14. This is desirable to insure that the coil 14 will be uniformly wetted by the refrigerant at all times.

As the refrigerant contacts the coil 14, it extracts heat from the water therein which has the dual effect of cooling the system water and causing the refrigerant to boil. The vaporized refrigerant then passes into the absorber 30 which is maintained at a pressure slightly lower than the pressure in the evaporator 12. In the absorber 30, an absorbent having a strong affinity for the refrigerant and a boiling point much higher than the refrigerant is sprayed through spray trees 32 onto the refrigerant vapor.

The most commonly used refrigerant-absorbent combination is water-lithium bromide (LiBR). Water is a preferred refrigerant since it possesses a high latent heat of vaporization which serves to minimize the amount of refrigerant necessary to provide a given amount of cooling. In addition, water has a low specific volume which serves to reduce the volume of the refrigerant which must be transported. Further, water has a working pressure near atmospheric which reduces the problem of leaks thereby lessening the cost of machine design and is safe, stable, and readily available at low cost. Lithium bromide is preferred principally because, with respect to water, it is an excellent absorbent.

In the absorber 30, the refrigerant vapor emanating from the evaporator condenses in the liquid lithium bromide solution to form a dilute solution which collects at the bottom of the absorber 30. The heat of condensation given up by the refrigerant during this process is removed by the condensing water which circulates through a coil 34 disposed in the absorber 30. The condensing water may come from, for example, a cooling tower 60. As shown, the dilute solution collected at the bottom of the absorber 30 passes out of the absorber in three controlled streams. One stream 35 passes into a pump 36 which pumps the solution into the concentrator 45. In the concentrator 45, the refrigerant is boiled out of the dilute solution, thus producing a concentrated refrigerant-absorber solution, i.e., one that has a higher percentage concentration of absorbent than the dilute solution. The concentrated lithium bromide solution is then mixed with the second controlled stream 37 of dilute solution. Mixed together, these solutions produce an intermediate refrigerant-absorbent solution, i.e., one in which the percentage of absorbent is somewhere between that found in the concentrated and the dilute solutions. This will be more fully explained hereinafter. The absorber pump 38 then pumps this intermediate solution into the absorber 30 through the spray trees 32 as is more fully described above. A third controlled stream 40 is a heat exchanger bypass tube connecting the concentrator sump directly to the absorber, and serves to limit the solution level in the concentrator 45 by bypassing excess solution directly back to the absorber 30. A first function of this bypass tube is that at the time of startup, the solution level in the concentrator 45 has a tendency to rise until the pressure difference between the concentrator 45 and absorber 30 is established. During this initial stage of operation, the solution may flow through both a heat exchanger 70 and the heat exchanger bypass tube 40, holding the solution in the concentrator 45 at the design level. A second function of the bypass tube is to conduct the full flow of heated solution directly back to the absorber 30 should crystallization block the return passages of the heat exchanger. This direct return of hot solution to the absorber 30 increases the temperature of the dilute solution returning to the concentrator 45 through the tubes in the heat exchanger 70, providing the necessary heat to break up the crystals, freeing the blocked passages. The lower part of the bypass tube 40 remains filled with solution at all times, thereby forming a liquid seal between the high and lower pressure sides of the system.

It will be apparent that heat must be supplied to the dilute solution in the concentrator 45 to raise the temperature high enough to drive out the water vapor.

Most commonly, as shown in FIG. 1, this is accomplished by circulating steam from a low pressure steam source 80 through a coil 46 disposed in the concentrator 45. The steam temperature being maintained at a value high enough to boil out the refrigerant yet below the boiling point of the absorbent. Typically, water will boil out of the dilute solution at about 210° F. while the boiling point of lithium bromide is about 1500° F. Consequently, the steam from the source 80 is maintained at a temperature between these two values. The water vapor boiled out of the lithium bromide solution in the concentrator 45 migrates to the condenser 20 which is maintained at a slightly lower pressure than the pressure found in the concentrator 45.

A coil 24, through which cooling water is circulated, is disposed in the condenser 20. As shown, the water in the coil 24 is the same water which has first been circulated through the coil 34. This is done since, as will become more fully apparent hereinafter, the condenser is typically maintained at a temperature of about 10° F. higher than the absorber temperature. After passing through the coil 24, the condensing water is returned to the tower 60 for recooling.

Upon contacting the coil 24, the vaporized refrigerant is cooled and condensed. The liquid refrigerant collects at the bottom of the condenser and eventually passes through the orifice 22 into the evaporator 12 thereby completing the refrigeration cycle.

Since the stream 35 of dilute solution must be heated in the concentrator 45 in order to drive out the refrigerant, and since the concentrated lithium bromide solution returned to the absorber 30 must be sufficiently cooled to maintain a constant absorber temperature, the system 10 will generally include the heat exchanger 70. As shown, the stream 35 of dilute solution passes through the heat exchanger 70 in one direction and a hotter concentrated solution passes through the heat exchanger 70 in the opposite direction. In the heat exchanger, the dilute solution takes on heat and, therefore, requires less heat input in the concentrator 45 from the steam source 80 while the concentrated solution gives up heat thus requiring less cooling in the absorber 30 to lower its temperature.

Figure 2:
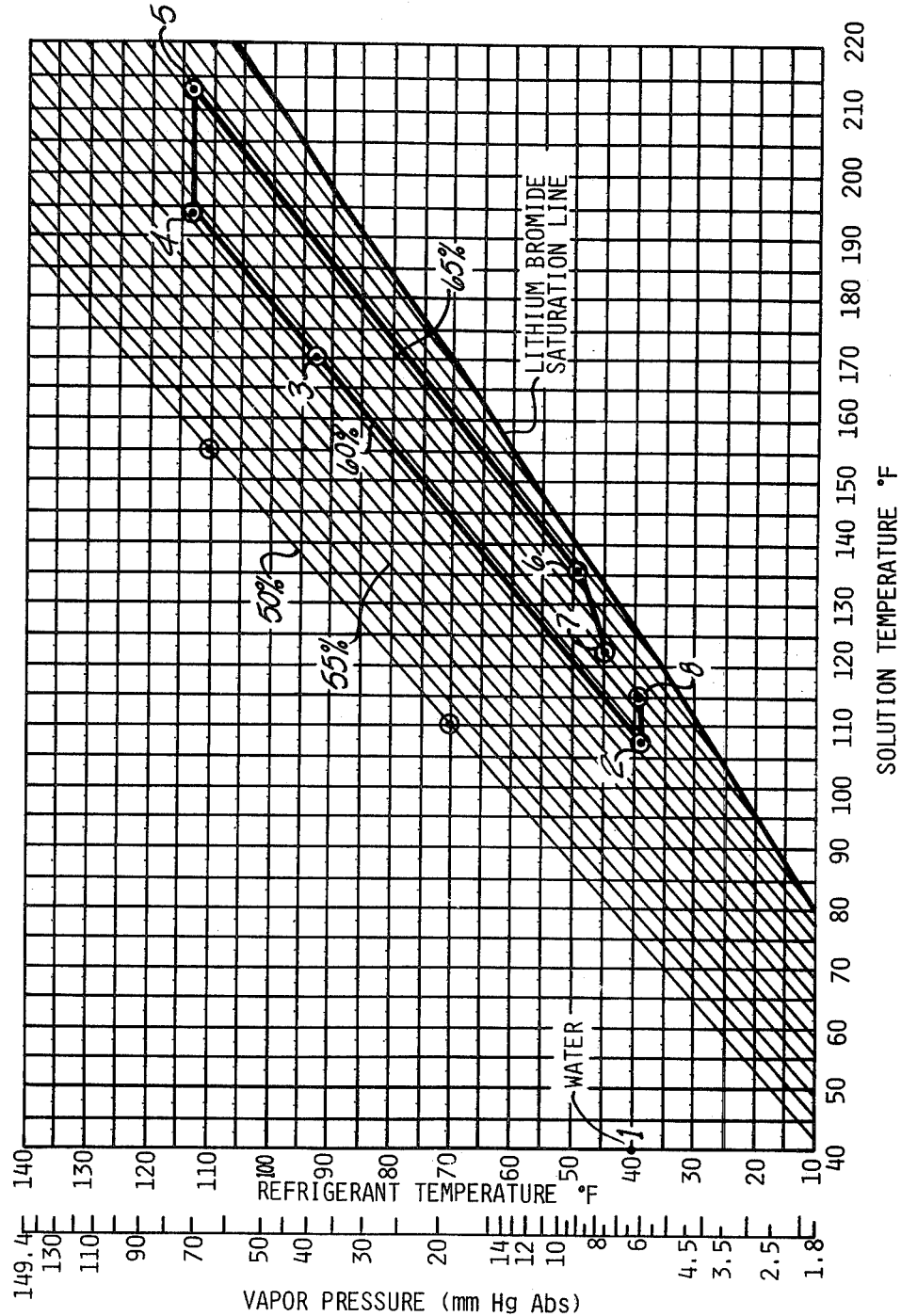
FIG. 2 is a graph illustrating the pressure temperature curves for the lithium bromide solution at various points throughout the refrigeration cycle.

Referring now to FIG. 2, which graphically illustrates the pressure-temperature curves for water and lithium bromide, the changes in pressure and temperature that occur throughout the system 10 will be more fully described.

Assuming that the system 10 is to cool the system water to 45° F., the refrigerant must vaporize at a temperature of about 40° F. Thus, with reference to FIG. 2, the evaporator pressure must be maintained at approximately 6.5 MM Hg (Point 1). Since the evaporator pressure must be slightly higher than the absorber pressure to insure that the vaporized refrigerant passes to the absorber, the absorber is maintained at a pressure of approximately 6.0 MM Hg. Depending upon the temperature in the absorber, this pressure will exist for various concentrations of the lithium bromide solution. The absorber temperature, however, is directly dependent upon the temperature of the water entering the coil 34. Since the water in the cooling tower 60 is typically 85° F., which, assuming that the surface area of the coil 34 is kept at an economical level, means that the absorber temperature will be about 107° F.; it may be seen from FIG. 2 that the concentration of the dilute solution in the absorber must be approximately 60 percent (Point 2) to keep the pressure in the absorber below the evaporator pressure. As the stream 35 of dilute solution passes out of the absorber 30, it first passes through the heat exchanger 70 where its temperature is raised to approximately 170° F. (Point 3). Thus, Point 3 represents the condition of the dilute solution as it enters the concentrator 45. In the concentrator 45, the steam from the source 80 passing through the coil 46 adds additional heat to the dilute solution until the vapor pressure of the solution reaches the condenser pressure at which point equilibrium is disrupted as some of the water molecules boiled out of the solution pass into the condenser 20.

In order to insure that water vapor will migrate from the concentrator 45 to the condenser 20 the pressure in the concentrator must be raised to a level slightly above the pressure in the condenser 20 which, in turn, is directly dependent on the condenser temperature. As noted above, the same water used to cool the absorber 30 is also used to cool the condenser 20. Thus, the temperature of the water entering the condenser coil 24 will be at about 95° F., which means that the temperature in the condenser 20 will typically be approximately 115° F. At this temperature, the condensing pressure of the refrigerant is about 78 MM Hg. Therefore, when the vapor pressure of the 60 percent solution exceeds about 78 MM Hg, a portion of the water vapor molecules in the concentrator 45 will migrate to the condenser 20. As shown in FIG. 2, the pressure of the 60 percent solution entering the concentrator will reach 78 MM Hg at a temperature of approximately 195° F. (Point 4). Therefore, assuming that the heat transfer surface in the concentrator is to be maintained at an economical figure, the steam entering the coil 46 in the concentrator 45 must be at approximately 245° F.

After passing through the heat exchanger 70 which reduces the temperature of the concentrated solution to approximately 135° F. (Point 6), the concentrated solution is mixed with the second stream 37 of dilute solution to produce an intermediate solution (Point 7). The intermediate solution is necessary for a number of reasons, the foremost of which is to prevent crystallization of the lithium bromide. With reference to FIG. 2, it can be seen that Point 6 is close to the crystallization line for lithium bromide. Consequently, if the concentrated solution were further cooled from this point without diluting its concentration, some crystallization would probably occur. Another reason is that by spraying a less concentrated solution on the coil 34, and hence a less viscous one, the surface of the coil 34 will be more completely wetted.

The reason the solution is concentrated to a high percentage concentration in the concentrator 45 and then diluted, is that the absorber 30 requires a higher rate of solution flow than the concentrator does. Thus, while the proper solution flow rate in the absorber 30 is maintained by recirculating a portion (stream 37) of the dilute solution, this necessitates overconcentrating the solution in the concentrator 45 in order that the intermediate solution sprayed on the coil 34 through the spray trees 32 will have the proper orientation. Spraying the intermediate solution through the spray trees 32 onto the coil 34 further cools the intermediate solution to a Point 8 in FIG. 2. At this point, the intermediate solution has the capacity to absorb additional water (refrigerant) vapor molecules from the evaporator. The more water vapor absorbed by the intermediate solution, the more dilute it becomes, the limit being imposed by the cooling availability in the absorber 30. By maintaining the absorber temperature at approximately 105°

F., the final concentration of the dilute solution will be about 60 percent (Point 2). As the solution passes over the absorber tube bundle, it is cooled and absorbs the refrigerant from the evaporator, as indicated by line 7-8-2.

Since the flow rate of the system water through the coil 14 is generally constant, it is necessary to maintain a given temperature and concentration of lithium bromide solution in the absorber 30 in order for the system 10 to produce a given amount of refrigeration. For example, assuming the concentration of the solution in the absorber 30 were reduced, the ability of the solution to absorb water vapor molecules migrating from the evaporator 12 would also be reduced which, in turn, would lower the refrigeration capacity of the system 10. On the other hand, if there is an increase in the concentration of the lithium bromide solution in the absorber 30, the solution will be capable of absorbing more water vapor molecules which, in turn, will increase the refrigeration capacity of the system.

As more fully described above, the concentration of the solution in the absorber is directly dependent upon the rate of flow of steam through the coil 46 in the concentrator 45. As the flow rate of the steam increases, more refrigerant is driven out of the dilute solution in the concentrator 45. As the flow rate of the steam increases, more refrigerant is driven out of the dilute solution in the concentrator with the result that the final concentration of the solution leaving the concentrator 45 is increased. This, in turn, results in an increase in the concentration of the intermediate solution fed into the absorber 30 through the spray trees 32. On the other hand, a decrease in the flow rate of steam through the coil 46 serves to reduce the amount of refrigerant driven out of the dilute solution which results in a decrease in concentration of the solution leaving the concentrator 45. This, in turn, will result in a decrease in the concentration of the intermediate solution in the absorber 30.

It is, therefore, obvious that the cooling capacity of the machine may be controlled by regulating the concentration of the solution entering the absorber 30. This may be done, for example, by disposing a three-way valve (not shown) on the line going to the concentrator 45; the valve may then be controlled to bypass the concentrator 45 and feed a portion of the dilute solution directly back to the absorber 30 thus reducing the concentration of the intermediate solution supplied to the absorber. Most commonly, however, this has been accomplished by disposing a single temperature sensor 71 at the output of the cooling coil 14 in the evaporator. The output of this temperature sensor is used to control a throttling steam or hot water valve 85 which is placed on the input line of the coil 46. Should the temperature sensor detect a rise in the supply or system water temperature, the throttling valve 85 will be opened wider, thereby increasing the heat input to the concentrator 45. As is more fully described above, this will result in an increase in the concentration of the intermediate solution which will increase the cooling capacity of the system 10. Conversely, if the temperature sensor detects a drop in the supply system water temperature, the throttling valve 85 will be positioned to reduce the heat input to the concentrator 45 which results in the decrease in the concentration of the intermediate solution in the absorber 30. This, in turn, will decrease the cooling capacity of the system 10. If the present invention were alternatively employed with a centrifugal refrigeration, the temperature sensor 71 would be used to control the cooling capacity of the machine by varying compressor inlet vane geometry.

This type of capacity control, however, has a number of deficiencies. Specifically, it is designed to demand and maintain the supply or system water at a constant temperature regardless of the load requirement on the refrigeration unit. Thus, assuming the load on the system 10 decreases, which is reflected by a lower return water temperature, the supply or system water temperature will also tend to decrease. As is more fully described above, when the temperature sensor 71 detects the drop in the supply or system water temperature, the control system will respond by reducing the amount of steam admitted to the system 10, thereby decreasing the concentration of the intermediate solution and reducing the cooling capacity of the system 10. Thus, it can be seen that the system will compensate for the reduced load by reducing the temperature differential between the supply or system water and the return water, while maintaining the temperature of the supplier system water at a constant low level. From a fuel consumption point of view, this is wasteful since additional energy (steam) is required to hold a stable chilled water temperature although the load on the system 10 has decreased.

Accordingly, the absorption cold generator is designed to hold a stable chilled water temperature over a wide range of load conditions. This, however, as indicated above, is wasteful in that, although the system, when in use, is designed to require a set chilled water temperature, it ignores internal and external dynamic operating variations which greatly affect the load conditions on the system thereby often causing overcooling of the chilled water and subsequently requiring reheating of this overcooled air supply in order to keep the building ambient requirements at a comfortable level. Examples of such variations would include, but not be limited to, local, climatic condition, sunlight playing on the structure (load), a large number of heat-liberating bodies (people or animals) within a relatively small building such as an auditorium, and the like.

Referring now again to FIG. 1, the preferred embodiment of the fuel conservation control system 5 will now be described.

As shown, the preferred system 5 includes a return water temperature sensor 101, a direct acting single input controller 111, a manual minimum position switch 130, and a manual, three-way, two-position, positive acting air switch 140 to divert flow from one branch line to another.

While the components of the control system 5 may be pneumatic, hydraulic, fluidic, electronic, electric, or any combination thereof, the preferred system 5 described herein is pneumatic. Accordingly, the sensor 101 is a transducer whose output is a pneumatic signal proportional to the sensed temperature.

As shown, the control system is designed to interrupt the signal of the temperature sensor 71 at the output of the cooling coil 14 which is used to control the throttling valve 85.

In order to understand the mode of operation of the present invention, it is first necessary to recognize that from FIG. 2, the lithium bromide solution used in the absorption refrigeration system is subject to crystallization under certain conditions. This is clearly indicated in FIG. 2 by the line indicated as the saturation line. It is essential that all operating points throughout the complete cycle be maintained above this line, otherwise crystallization of the lithium bromide will occur. In other words, the Figure shows at what temperatures and vapor pressures the solution can be expected to begin crystallizing. If the solution equilibrium point falls on this saturation line, the solution is fully saturated. This means that the solution contains as much lithium bromide as it possibly can without lithium bromide crystals forming and precipitating out. If water were removed from such a solution, or if the solution were allowed to cool, salt crystals would form.

Crystallization is of very special concern when power failure occurs and the machine cannot operate through its normal dilution cycle. Then, as the concentrated lithium bromide solution cools, the equilibrium point changes along a given concentration line. If the equilibrium point falls below the saturation line, crystallization will occur. Ambient temperature within the system and solution concentration are the determining factors.

As explained above, equilibrium is disrupted by applying heat to the dilute solution in the concentrator 45 to raise its vapor pressure to or above the condensing pressure, thereby disrupting the equilibrium. At this point, the number of water vapor molecules leaving the solution is greater than the number of water vapor molecules re-entering the solution because the water vapor leaving the solution is no longer confined. It can pass into the condenser 20. The temperature and vapor pressure at which equilibrium is disrupted is determined by the pressure and temperature in the condenser section. When the concentrator's solution pressure becomes greater than the condensing pressure, water vapor begins to leave the lithium bromide solution and pass into the condenser.

In order to prevent crystallization, the machine has internal safety shut down features which cannot be disrupted by the control of the inventive device described herein. The minimum pressure at which the machine will shut down to avoid crystallization is a function of the machine operation and is normally provided to the user of the machine by the manufacturer. In the preferred embodiment, it is known that the steam valve may not be allowed to drop below providing five pounds of steam in order to avoid crystallization. Accordingly, to prevent the inventive device from generating a pressure signal below the built-in safety shut down pressure, the inventive device utilizes a minimum position switch 130. This minimum position switch 130 is used in the control system and is preset to approximately one pound higher than the machine safety shut down feature of five pounds. In other words, the minimum position switch 130, regardless of the signal it receives from the direct acting single input controller, will never be allowed to generate a signal to the steam valve 85 less than six pounds pressure. Therefore, if it is desired to bypass the control means of the present invention, the manual selector switch 140 is connected between pole 1 and 2 which allows the steam valve operation to be a function of the chilled water temperature sensed directly in the outlet of the coil 14 with the provision that the machine branch conduit or inlet signal port 150 pressure will never be below the safety minimum signal that is built into the machine operation. The safety minimum operational presettings within the normal machine operation can never be overridden by the control device. At the same time, should the condition exist within the machine requiring shut down according to the internal safety criteria, the machine will override the control device and shut down regardless of the signal generated by the control device.

When it is desired to conserve fuel during operation of the absorption refrigeration system 10, the manual selector of the switch 140 is closed between poles 2 and 3, thereby bringing into operation the direct acting single input controller and return water temperature sensor 101. Again, under this condition, the control system 5 is elected to provide a signal to the steam valve 85 which is a function of return water temperature, as well as chilled water outlet temperature and that can never be lower than the predetermined minimum signal of six pounds preset in the minimum position switch 130.

The direct acting single input controller 111 is also conventional and may, for example, be Honeywell direct-acting single input Model RP 908A. The controller is a pneumatic amplifier which takes a small pressure change from a sensor and amplifies it into a predetermined branch line output pressure. The controller 111 acts on a change of sensor pressure, regardless of what the control variable is. In the single direct-acting controller 111, the main signal is supplied through the "M" port to the valve unit, sensor live, and sensor "1" chamber. The main signal supply in this embodiment is the temperature sensor 71 of the bulb in the chilled water cooling coil 14 outlet. When the fuel conservation control system 5 is in use, the controller 111 has the return water temperature sensor 101 connected to port 1 thereof. The sensor 101 is provided with a main pressure source for proper operation with an external restrictor 113. The temperature sensor 101 is of the liquid-sensing bulb type. An example of this type of component of the control system may be, for example, a Honeywell Model L-7033 liquid temperature sensor.

It can readily be seen by those skilled in the art that by providing the proper proportional band setting and set point, the controller 111 signal output at port B, which is applied to the steam valve 85, can be readily made a function of the temperature of chilled water returning from the load. For purposes of the preferred embodiment, the sensor 101 can be preset to permit more steam to be delivered to the steam valve 85 as the returning chilled water temperature increases, thereby increasing the cooling capacity of the machine.

Referring to FIG. 3, an alternative embodiment of a control system 5 is illustrated in which a direct acting dual input controller 110 is substituted for the controller 111 of the preferred embodiment of the invention illustrated in FIG. 1. In FIG. 3, the return chilled water temperature sensor 101 is connected to port 2 of the controller 110, and either an outdoor temperature sensor 100 or an outdoor humidity sensor 90 connected to port 1 thereof.

Referring to FIG. 4, a second alternative embodiment of a control system 5" is illustrated in which direct acting dual input controller 110 is added in addition to the controller 111 of the preferred embodiment of the invention, illustrated in FIG. 1. In FIG. 4, the outdoor temperature and humidity sensors 100 and 90, respectively, are connected to ports 1 and 2 of the controller 110. The return water temperature sensor is connected to port 1 of controller 111. Port B of the controller 110 is connected to port 1 of a second manual three-way, two-position positive acting air switch 160. Port B of the controller 111 is connected to port 3 of the air switch 160 and port 2 of the air switch is connected to port P of minimum position switch 130. The air switch 160 allows for manual diversion of flow from branch one line to another, whereby, a system operator could manually select between a system embodying the present invention or one embodying the invention, as described in U.S. Ser. No. 147,603, filed May 7, 1980, which is hereby incorporated herein by reference. In its broadest sense, however, it is contemplated that the air switch 160 could include a second direct-acting dual input controller which would produce an output control signal to the minimum position switch 130, as a simultaneous function of the branch line output signals of the controllers 110 and 111. The details of such an alternative are deleted here for the sake of brevity.

When the fuel conservation control system 5' of FIG. 3 is in use, the controller 110 has either the outdoor temperature sensor 100 or the outdoor humidity sensor 90 connected to port 1 and the chilled water return temperature sensor 101 connected to port 2.

When the fuel conservation control system 5 of FIG. 4 is in use, the controller 110 has the outdoor temperature sensor 100 connected to port 1 and the outdoor humidity sensor 90 connected to port 2. The controller 111 has the temperature sensor 101 connected to port 1. All of these sensors are provided with a main pressure source for proper operation with external restrictors 113. The temperature sensor 100 works on the force balance principle wherein two forces oppose one another until both are equal in balance. In the sensor 100, these forces are bimetal forces trying to close a flapper down over a nozzle and the air pressure in the nozzle chamber trying to hold the flapper up. As the temperature increases, the bimetal strip exerts a downward force on a lever, causing a small movement toward the nozzle. This closing off of the nozzle obstructs the flow of air, thereby increasing the pressure within the nozzle's chamber and feedback chamber. The bellows exert an upward force on a main lever, opposing the downward force caused by the temperature increase. When these two forces are in balance, the increased sensing pressure is transmitted back to the controller 110, reflecting a linear relationship between temperature and pressure. A decrease in temperature reverses the above operation and reduces the pressure to a new position of equilibrium. An example of this type of component of the control system may include, for example, Honeywell Model LP 914A or LP 915A pneumatic temperature sensors. Likewise, the humidity sensor 90 used in the invention measures the relative humidity at the point of mounting of the element. The sensors 90 and 100 use nylon as the humidity measuring element and are provided with compensation for the affect of measuring at various temperatures. Again, the humidity sensor 90 operates on a force balance principle wherein the upward force acting on a main lever from a nylon element acts through a linkage and the pressure in a chamber acting on a flapper are balanced by a tension spring and a compression spring. Upon an increase in humidity, the nylon element expands, relieving tension on the linkage, and allows the main lever and flapper to move closer to a nozzle. This causes the pressure in the chamber to increase, rebalancing the forces on the main lever and increasing the output pressure in the sensor line. Upon a decrease in humidity, the nylon element contracts, thereby increasing the tension on the linkage and compression spring which results in a reduced pressure in the chamber and in the sensor line. Such a humidity sensor may be, for example, a Honeywell Pneumatic Humidity Sensor Model No. HP 971A.

The direct acting dual input controller 110 is also conventional and may, for example, be a Honeywell Direct Acting Dual Input Model RP 908B. The controller is a pneumatic amplifier which takes a small pressure change from a sensor and amplifies it into a predetermined branch line output pressure. The controller 110 acts on a change of sensor pressure, regardless of what the control variable is.

In the dual direct acting controller 110, the main signal is supplied through the "M" port to the valve unit, sensor line, and sensor "1" chamber. The main signal supply in this embodiment is the temperature sensor of the bulb in the chilled water cooling coil 14 output. On an increase in outside temperature, as measured by the temperature sensor, pressure in both the sensor line and the sensor chamber increases. The increased pressure in the chamber exerts a force on the main lever causing it to rotate clockwise about its pivot point. The force on the main lever acts on the proportional band lever through the proportional band adjustment, causing the proportional band lever to rotate counterclockwise about the direct acting proportional band lever pivot point. This force supplied to the proportional band lever forces the flapper operating arm upwards, causing the flapper to rotate clockwise about its pivot point. The main nozzle opens, increasing the pressure in the feedback chamber and the branch line. Increased pressure in the feedback chamber rebalances the forces acting on the main lever and the main nozzle closes. The resulting branch line pressure change then actuates the final control element which, in this case, through the minimum position switch 130 is the steam valve 85.

A decrease in temperature results in a decreased pressure in the sensor line and the sensor's chamber. Since the forces of the set point spring and the feedback chamber are now greater than the decreased chamber pressure, the main lever rotates counterclockwise, giving rise to a series of lever movements opposite in direction to those described above. As an end result, the flapper moves counterclockwise to open the exhaust nozzle. Reduced pressure to the feedback chamber and the branch line are the result of the nozzle opening. Reduced pressure in the chamber moves the flapper clockwise to close the exhaust and to oppose any further movement of the main lever.

The dual input controller can also be adpated into a reverse acting device by moving the proportional band pivot screw to the reverse acting position and attaching the reverse acting springs to the spring posts. The operation of the device then is exactly the reverse as that described above.

It can readily be seen by those skilled in the art that by providing the proper proportional band setting and set point, the controller 110 signal output at port B, which is applied to the steam valve 85, can be readily made a function of the outdoor temperature and outdoor humidity. For purposes of the alternative embodiments of FIGS. 3 and 4, the outdoor temperature sensor 100 can be preset to permit more steam to be delivered to the steam valve as the temperature outdoors increases, thereby increasing the cooling capacity of the machine. Likewise, the outdoor humidity sensor 90 would permit more steam to be delivered through the minimum position switch 130 to the steam valve 85 as the outdoor humidity increases. An example of operation, with the fuel conservation unit, is as follows. If outdoor temperature is 75° F., and the outdoor humidity is 35 percent, the fuel conservation unit is preset to allow approximately an 8 psi signal to activate the steam valve, thus raising the chilled water temperature to 58° F. If outdoor air remained at 75° F. and the outdoor humidity rose to 70 percent, the fuel conservation unit would allow a higher pressure signal to the steam valve through the combination of the controller and minimum position switch thereby lowering the chilled water temperature to 52° F. to permit more cooling. The 35 percent drop in humidity sensed by the humidity sensor is seen by the controller as a requirement to provide one less psi of signal on the controller, thereby permitting a higher chilled water temperature. (The adjustment on the controller is preset for outdoor humidity at 10 percent of its sensed signal and the proportional band is preset at 14 percent. Therefore, for each approximate 40 percent increase in outdoor humidity, the controller, through its presetting, will recognize this change as an additional output signal of approximately 1 psi on the controller to provide additional cooling. Likewise, a 40 percent drop in humidity outdoors will lessen the demand signal on the controller by 1 psi. Accordingly, permitting the chilled water temperature is permitted to rise approximately 6° F. before demanding more steam to keep the absorption refrigeration machine responsive to satisfy indoor requirements). Accordingly, a rise in outdoor air temperature would result similarly in lowered chilled water temperature (demand more steam to be delivered to the concentrator 45) while a drop in outdoor air would permit the chilled water temperature to rise without the need of operating the steam valve, ergo, the fuel conservation.

It is understood by those skilled in the art that the above Figures are examples and are all adjustable at the controller and the minimum position switch. The general concept is that the fuel conservation unit lowers the pressure signal received by the steam valve as a result of lowering chilled water return temperature, as well as outdoor air and outdoor humidity, thereby reducing steam requirements from the steam source and permitting the chilled water outlet temperature to rise. If returning chilled water and/or outdoor air and humidity call for more cooling, the fuel conservation unit regulates the pressure signal generated at the output B of the direct acting controller 110 in FIG. 3 and terminal 2 of the switch 160 in FIG. 4 to provide a higher pressure to a steam valve and, in turn, cooler, chilled water output would be generated. Again, it must be understood by those skilled in the art that the settings cover a wide temperature span. Also, the calibrations are adjustable and can produce any desired cooling needs. Once set for individual needs, the fuel conservation unit needs no further adjustment. In effect, it becomes the main controller for the absorption refrigeration machine.

Thus, as opposed to a conventtional controller in which a signal transmitter is disposed in the supply water line and the signal from the transmitter operates the steam valve 85 to maintain the supply water temperature at a constant value, the control systems 5' and 5" of the present invention, by sensing the chilled water return temperature and, alternatively, the outdoor temperature and humidity, anticipates load changes on the system 10 as a result of all dynamic operating variations which affect the load, including climatic conditions, and allows the supply pressure line 150 to the steam valve 85 to seek out proportional values in which the system 10 will once again be in equilibrium.

Under the conditions of the control systems 5, 5' and 5", energy is conserved by providing a demand signal to the steam valve which, in effect, "lies" with respect to the demand of the sensor 71 in the chilled water outlet cooling coil 14 output. This so called "lie" is generated in the controller by the effect of the chilled water return temperature and, alternatively, the outdoor temperature and humidity sensors, or a combination of these sensors 90 and 100 acting through the single/dual input direct acting controller 111/110 upon the sensed temperature sensor 71 bulb signal in the cooling system coil 14 which is then supplied to the output or the controller and thereafter to the steam valve 85.

All the components of the control systems 5, 5' and 5" illustrated in FIGS. 1, 3 and 4 are conventional as set forth above. Again, to repeat, the outdoor temperature sensor may be, for example, a Honeywell Model LP 914A; the pneumatic humidity sensor may be, for example, a Honeywell Model LP 971A; the direct acting dual input controller may be a Honeywell Model RP 908B; the minimum positioning switch may be a Honeywell manual-minimum positioning switch SP 93A or SP 970A; the manual selector switch may be a Honeywell Toggle Switch Model 802550; the direct acting single input controller may be a Honeywell Model RP 908A; and the liquid temperature sensor may be a Honeywell Model L 7033.

Normally, the throttling steam valve 85 will be part of the refrigeration system 10 whose operation is to be controlled. In the event the control systems 5, 5' and 5" are pneumatic, for example, and the throttling valve 85 is an electrically-operated valve, the output pressure signal from the control system could first be fed to a suitable signal transducer which would convert this pressure signal to a suitable electrical signal. The output from the transducer can then be used to control the throttling valve 85.

In those refrigeration systems which employ, for example, a boiler to generate steam which is then fed into the concentrator 45, the output from the control system instead of controlling the throttling valve 85 could be directly used to control the heat input into the boiler. In fact, it is contemplated that the output of the control systems 5, 5' and 5" be used to control whatever means are employed to control the capacity of the refrigeration system.

Also, numerous other components other than those illustrated in FIG. 1 may be employed to effect the type of control described above. Thus, it should be recognized that the components of the control systems 5, 5' and 5", illustrated in FIGS. 1, 3 and 4, as well as their arrangements, are merely exemplary of the many different components which may be employed to affect the type of control described above.

Skilled art workers will immediately recognize that the initial calibration of the temperature sensor, humidity sensor, minimum position switch, and direct acting dual input controller, will be dependent upon the particular refrigeration system in connection with which the control systems 5, 5' and 5" of the present invention are employed. Thus, it should be understood that the values given in the above-detailed description are strictly exemplary. Since these and other changes and modifications are within the scope of the present invention, the above description should be construed as illustrative and not in a limiting sense.

What is claimed is: 1

1. A control system for controlling the refrigeration capacity of a refrigeration system in operative relation to control the temperature of a fluid medium for the climate control of building air in response to dynamic operating variations which effect temperature changes in said fluid medium, said refrigeration system comprising:

a source of refrigerant;

evaporator means for vaporizing said refrigerant and causing said refrigerant vapor into heat transfer relationship with said fluid medium to be cooled, said evaporator means having an inlet for receiving said fluid medium to be cooled and an outlet for discharging cooled fluid medium from said evaporator means;

condenser means for causing said refrigerant into heat transfer relationship with a cooling medium which extracts heat from said refrigerant vapor thereby condensing said refrigerant vapor to liquid form;

refrigerant distribution means operatively communicating with said condenser means to raise the pressure of said refrigerant vapor, said refrigerant distribution means further communicating with said evaporator means to receive said refrigerant vapor therefrom, said refrigerant distribution means further having refrigerant control means, said refrigerant control means comprising:

means for generating a first signal responsive to variations in the temperature of said fluid medium for the climate control of building air;

generating means for generating a second signal at a predetermined level, said generating means comprising a minimum position switch means connected to said refrigerant control means for terminating the operative effect of said first signal means when said first signal is less than said second signal at said predetermined level;

means for generating a third signal responsive to the variation in temperature of said fluid medium in said evaporator means outlet, said third signal being communicated to said refrigerant control means; and controller means connecting said first and third signals for providing a fourth signal as a function of said first and third signals, said fourth and second signals further being connected to said minimum position switch means for continuously controlling said refrigerant distribution means, said minimum position switch means further selecting the greater of said fourth and second signals dependent on its relative value as compared to the lesser of said fourth and second signals to control the refrigerant distribution means thereby continuously controlling said refrigerant distribution means as a function of said fluid medium temperature in said evaporator means inlet on a real time basis.

2. A method of controlling the refrigeration capacity of a refrigeration system in operative relation to control the temperature of a fluid medium for the climate control of building air in response to dynamic operating variations which effect temperature changes in said fluid medium, said refrigeration system having a source of refrigerant, evaporator means for vaporizing said refrigerant and causing said refrigerant vapor into heat transfer relationship with said fluid medium to be cooled, said evaporator means having an inlet for receiving said fluid medium to be cooled and an outlet for discharging cooled fluid medium from said evaporator means, condenser means for causing said refrigerant into heat transfer relationship with a cooling medium which extracts heat from said refrigerant vapor thereby condensing said refrigerant vapor to liquid form, and refrigerant distribution means operatively communicating with said condenser means to raise the pressure of said refrigerant vapor, said refrigerant distribution means further communicating with said evaporator means to receive said refrigerant vapor therefrom, said method comprising the steps of:

sensing variations in the temperture of said fluid medium in said evaporator means inlet and providing a first signal responsive to said sensed temperature variations in said fluid medium;

generating a second signal at a predetermined level;

terminating the operative effect of said first signal when said first signal is less than said second signal;

sensing variations in the temperature of said fluid medium in said evaporator means outlet and providing a third signal indicative of said sensed temperature variations in said fluid medium;

connecting said first and third signals and providing a fourth signal as a function of said first and third signals;

coupling said fourth signal and said second signal to a minimum position switch to select the greater of said fourth and second signals dependent on its relative value as compared to the lesser of said fourth and second signals and providing a control signal indicative of said one selected signal; and connecting said control signal to continuously control said fluid distribution means as a function of fluid medium temperature in said evaporator means inlet on a real time basis.

3. A control system for controlling the refrigeration capacity of a refrigeration system in operative relation to control the temperature of a fluid medium for the climate control of building air in response to dynamic operating variations which effect temperature changes in said fluid medium and in further response to outdoor climatic variations, said refrigeration system comprising:

a source of refrigerant;

evaporator means for vaporizing said refrigerant and causing said refrigerant vapor into heat transfer relationship with said fluid medium to be cooled, said evaporator means having an inlet for receiving said fluid medium to be cooled and an outlet for discharging cooled fluid medium from said evaporator means;

condenser means for causing said refrigerant into heat transfer relationship with a cooling medium which extracts heat from the refrigerant vapor thereby condensing said refrigerant vapor to liquid form;

refrigerant distribution means operatively communicating with said condenser means to raise the pressure of said refrigerant vapor, said refrigerant distribution means further communicating with said evaporator means to receive said refrigerant vapor therefrom, said refrigerant distribution means further having refrigerant control means, said refrigerant control means comprising:

means for generating a first signal responsive to the variation in temperature of said fluid medium in said evaporator means inlet for the climate control of building air;

generating means for generating a second signal at a predetermined level, said generating means comprising a minimum position switch means connected to said refrigerant control means for terminating the operative effect of said first signal when said first signal is less than said second, signal at said predetermined level;

means for generating a third signal responsive to the variation in temperature of said fluid medium in said evaporator means inlet, said third signal being communicated to said refrigerant control means;

means for generating a fourth signal responsive to variations in predetermined outdoor climatic conditions, said fourth signal being communicated to said refrigerant control means; and controller means connecting said first, third and fourth signals for providing a fifth signal as a function of said first, third and fourth signals, said fifth and second signals further being connected to said minimum position switch means for controlling said refrigerant distribution means, said minimum position switch means further selecting the greater of said fifth and second signals dependent on its relative value as compared to the lesser of said fifth and second signals to control the refrigerant distribution means thereby continuously controlling the refrigerant distribution means as a function of said fluid medium temperature in said evaporator means inlet on a real time basis and, further, as a function of outdoor climatic conditions.

4. A control system for controlling the refrigeration capacity of a refrigeration system in operative relation to control the temperature of a fluid medium for the climate control of building air in response to dynamic operating variations which effect temperature changes in said fluid medium and in further response to outdoor temperature and humidity variations, said refrigeration system comprising:

a source of refrigerant;

evaporator means for vaporizing said refrigerant and causing said refrigerant vapor into heat transfer relationship with said fluid medium to be cooled, said evaporator means having an inlet for receiving said fluid medium to be cooled and an outlet for discharging cooled fluid medium from said evaporator means;

condenser means for causing said refrigerant into heat transfer relationship with a cooling medium which extracts heat from the refrigerant vapor thereby condensing said refrigerant vapor to liquid form;

refrigerant distribution means operatively communicating with said condenser means to raise the pressure of said refrigerant vapor, said refrigerant distribution means further communicating with said evaporator means to receive said refrigerant vapor, said refrigerant distribution means further communicating with said evaporator means to receive said refrigerant vapor therefrom, said refrigerant distribution means further having refrigerant control means, said refrigerant control means comprising:

means for generating a first signal responsive to the variation in temperature of said fluid medium in said evaporator means inlet for the climate control of building air;

generating for generating a second signal at a predetermined level, said generating means further comprising a minimum position switch means connected to said refrigerant control means for terminating the operative effect of said first signal when said first signal is less than said signal at said predetermined level;

means for generating a third signal responsive to the variation in temperature of said fluid medium in said evaporator means outlet, said third signal being communicated to said refrigerant control means;

means for generating a fourth signal responsive to variations in outdoor ambient air temperatures, said fourth signal being communicated to said refrigerant control means;

means for generating a fifth signal responsive to variations in outdoor ambient air humidity, said fifth signal being communicated to said refrigerant control means;

selector control means connected to said minimum position switch means; and controller means connecting said first and third signals for providing a sixth signal as a function of said first and third signals, said controller means further connecting said third, fourth and fifth signals for providing a seventh signal as a function of said third, fourth and fifth signals, said sixth and seventh signals further being connected to said selector control means for selectively controlling said refrigerant distribution means as a function of said second, sixth and seventh signals.

5. The control system as claimed in claim 4 wherein said selector control means further comprises a dual port controller, said dual port controller connecting said third, sixth and seventh signals for providing an eighth signal as a function of said third, sixth and seventh signals, said eighth signal and said second signal further being connected to said minimum position switch means for controlling said refrigerant distribution means, said minimum position switch means further selecting the greater of said eighth and second signals dependent on its relative value as compared to the lesser of said eighth and second signals to control the refrigerant distribution means thereby continuously controlling said refrigerant distribution means as a function of fluid medium temperature in said evaporator means inlet on a real time basis and further controlling said refrigerant distribution means as a function of outdoor air temperature and humidity.

6. The control system as claimed in claim 4 wherein said selector control means further comprises a manual three-way, two-position positive acting air switch, said manual three-way, two-position positive acting air switch further being operative to receive said sixth and seventh signal and selectively connecting either said sixth or seventh signal to said minimum position switch such that said refrigerant distribution means is operative as a function of either said second and sixth signals or said second and seventh signals.

* * * * *

UNITED STATES PATENT AND TRADEMARK OFFICE
CERTIFICATE OF CORRECTION

PATENT NO. : 4,487,026

DATED : December 11, 1984

INVENTOR(S) : Vincent J. Alfano

It is certified that error appears in the above-identified patent and that said Letters Patent is hereby corrected as shown below:

Column 3, line 64, after "inlet" delete the comma "," and insert the semi-colon ---- ; ----.

Column 12, line 62, after "that" insert a comma ---- , ----.

Column 14, line 47, delete the numeral "5" and insert the numeral ---- 5' ----.

Column 15, line 19, delete the numeral "5" and insert the numeral ---- 5" ----.

Column 17, line 23, delete "permitting".

Column 17, line 47, before "switch" insert ---- air ----.

Column 17, line 56, delete "conventtional" and insert ---- conventional ----.

UNITED STATES PATENT AND TRADEMARK OFFICE
CERTIFICATE OF CORRECTION

PATENT NO. : 4,487,026
DATED : December 11, 1984
INVENTOR(S) : Vincent J. Alfano Sheet 2 of 2

It is certified that error appears in the above-identified patent and that said Letters Patent is hereby corrected as shown below:

Column 18, line 68, delete the numeral "1".

Column 19, line 36, delete "wnen" and insert ---- when ----.

Column 21, line 4, after "second" delete ",".

Column 22, line 3, before "for" insert ---- means ----.

Column 22, line 8, after "said", second occurrence, insert ---- second ----.

Signed and Sealed this

Twenty-third Day of April 1985

[SEAL]

Attest:

DONALD J. QUIGG

Attesting Officer

Acting Commissioner of Patents and Trademarks